No. 889,661. PATENTED JUNE 2, 1908.
W. M. CORTHELL.
ART OF COATING HOOKS AND EYES AND APPARATUS THEREFOR.
APPLICATION FILED OCT. 11, 1907.
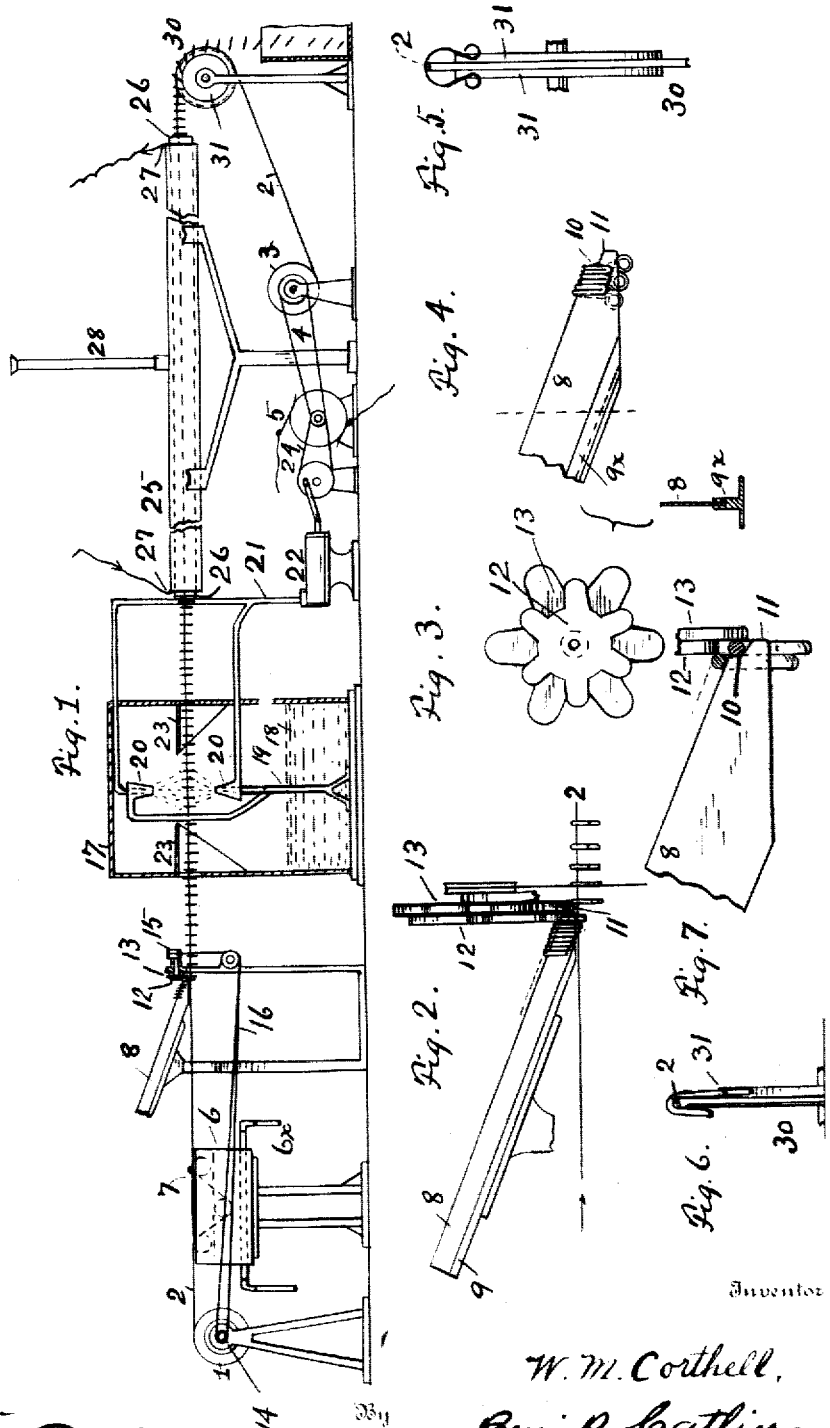

UNITED STATES PATENT OFFICE.

WILLIAM M. CORTHELL, OF CHICAGO, ILLINOIS, ASSIGNOR TO F. M. WATERMAN, OF CHICAGO, ILLINOIS.

ART OF COATING HOOKS AND EYES AND APPARATUS THEREFOR.

No. 889,661.   Specification of Letters Patent.   Patented June 2, 1908.

Application filed October 11, 1907. Serial No. 397,016.

*To all whom it may concern:*

Be it known that I, WILLIAM M. CORTHELL, a resident of Chicago, in the county of Cook and State of Illinois, have invented certain new and useful Improvements in the Art of Coating Hooks and Eyes and Apparatus Therefor; and I do hereby declare the following to be a full, clear, and exact description of the invention, such as will enable others skilled in the art to which it pertains to make and use the same.

This invention relates to applying enamel or the like to hooks and eyes, its object being to conveniently, cheaply and rapidly apply liquid enamel or other coating material, in regulated quantities and evenly to the hooks or eyes, and to fix the same on said articles, and to discharge the completed articles by a continuous operation.

The invention consists in the method and apparatus hereinafter described and particularly pointed out.

In the accompanying drawing which illustrates the invention and forms part of the specification,—Figure 1 is an elevation partly in section showing the parts of the apparatus arranged and connected for use; Fig. 2 is an enlarged partial section showing feed and spacing devices, with several eyes to be fed onto a wire; Fig. 3 is a side view of a stop and spacing device; Fig. 4 is a partial side view, and a cross section, of a feed bar used for hooks; Fig. 5 is an edge view of an eye (or hook) discharging wheel; Fig. 6 is a partial edge view of a modified discharging wheel showing its operation on hooks; Fig. 7 is an enlarged view of the foot of the feed bar, eyes thereon being in section, the eyes being held back by the lower tooth of the spacing device.

Heretofore attempts have been made to enamel hooks and eyes but without good results, for the reason that it has not been found practicable with old methods to evenly distribute the enamel in the right quantity on such articles, there being objectionable accumulations of material at certain points on them.

By this improvement the hooks or eyes are not dipped in a bath of enamel, or the like, but such material (of any selected color) is sprayed in finely divided condition onto them, which gives a thin, even coating without objectionable gathering of drops or quantities of the coating material at the bottom of the articles, or between closely adjacent parts of the wire, as between the two parallel members of a hook shank, or in a thread-receiving loop of an eye.

Numeral 1 denotes a rotatable supply spool on which is wound a long fine wire 2 which extends to a receiving spool 3 at the opposite end of the apparatus, and suitably driven, as by a belt 4 from an electric motor 5.

6 indicates a tank having guide rollers which guide wire 2 through a bath of a material which will coat the wire and tend to prevent the sprayed enamel from adhering to the wire, or if some does adhere will render its removal easy. Paraffin, heated in suitable manner, as by a steam pipe $6^x$, is suitable for the purpose named. A piece of felt 7 or the like rubs against the outgoing wire to remove excess of material.

An inclined feed bar or plate is shown at 8. This is supported in a vertical plane, and is sufficiently thin to pass between the shank and the hook end of a hook, or between the ends of an eye. Preferably the width of this bar or plate is greater than the length of the hooks or eyes to be treated.

The lower edge of plate 8 has a strengthening part 9 which may be secured to a support. In Fig. 2 part 9 is a flange on the lower edge of the plate itself. In Fig. 4 it is a thicker bar $9^x$ having flanges and having a groove in which part 8 is held. Bar 8 at its lower end has a step 10 of a little greater height than the diameter of wire used in making the hooks or eyes. The step terminates in an end 11 projecting close to and just above wire 2, and of greater inclination than the main part of the bar. Eyes are hung on this bar 8 by hand or otherwise as indicated in Fig. 1, or hooks as in Fig. 4, and they tend to slide down thereon by gravity.

Adjacent the step 10 and above it is a spacing device comprising a toothed disk 12 near the step so that when one of its teeth is in front of the step the eyes (or hooks) are held back thereby; but a space or notch allows one to pass. The device comprises also a larger toothed disk 13, the teeth and notches of which break joints with those of disk 12, and which stands over the end 11, and when a tooth is directly in front of it the eye which has been last deposited on said end by disk 12 is held from moving forward on to the wire, but when the disk moves forward bringing a notch over said end 11 the eye is released and drops onto the moving wire 2. The teeth and notches of the connected disks 12 and 13 are so arranged that the lower long tooth through the medium of the eye last advanced onto end 11 holds all the eyes on the bar 8 until a tooth of disk 12 comes into position to hold them, when the long tooth moves out of the way and allows the eye on end 11 to slip from the steeply inclined end onto wire 2, and so on repeatedly.

In Fig. 7 the bottom long tooth is holding all the eyes back and a tooth on disk 12 is about to come into place to hold them.

The distance between successive hooks or eyes will depend on the speed of movement of the wire 2, and the speed at which the spacing device is driven, for example, by pulleys 14, 15 and belt 16.

17 denotes a spraying chamber having openings in its ends through which wire 2 with spaced eyes thereon moves. In the chamber is a supply 18 of colored enamel or the like, from which rises a pipe 19 open below the liquid, and provided with terminal spraying nozzles 20, one above and one below wire 2. 21 is a pipe extending from any suitable source of compressed air, as an air pump 22, and terminating in said nozzles to spray the enamel onto the articles on the wire 2 between them. Over the openings in the tank are hoods 23 to partly cover the wire except in the central part, and to prevent escape of sprayed material. The air pump may be driven by a belt 24 from the motor 5.

25 denotes a drying or baking chamber or device comprising an open ended tube 26 of suitable length and size through which the wire 2 with its spaced and sprayed articles travels, and heating means, preferably a suitably protected heating coil 27 thereon. If desired a vent tube 28 for vapor may be provided.

30 denotes an eye (or hook) removing device. Its edge is thin to extend between the thread-receiving loops of an eye, or between the shank and the hook end of a hook. The periphery is grooved, and wire 2 passes over the wheel on its way to the spool 3 as shown. At a distance less than the length of an eye (or hook) from the periphery of said wheel is a shoulder 31 forming a thickening of the wheel. There may be such a shoulder on both sides, as in Fig. 5 or on one side as in Fig. 6. As the wire advances the forward eye (or hook) at its lower end strikes the thick part of said wheel, is tilted thereby, and finally drops or is forced off and falls into a receptacle.

Having described the invention what I claim is,—

1. The improvement in the art of coating hooks, eyes, or the like, which consists in separately supporting them on a movable support spraying enamel or similar coating material in finely divided condition onto such separately moving articles, and subsequently baking.

2. The improvement in the art of coating hooks and eyes or the like, which consists in moving such articles separately suspended through a chamber, spraying liquid enamel in divided condition onto such articles, and moving the sprayed articles through a heated chamber.

3. In apparatus for coating hooks, eyes, or the like, a moving support for such articles, means for separately hanging such articles on said moving support means for spraying the coating material onto the separate hanging articles, and a heating chamber for baking the same.

4. In apparatus for enameling hooks and eyes, a supporting wire, means for moving the wire longitudinally with hooks or eyes hung thereon, means for spraying enamel or the like onto said moving articles, and means for fixing the sprayed material thereon.

5. In apparatus for enameling hooks, eyes, or the like, a supporting wire, means for moving the wire longitudinally, means for automatically hanging hooks or eyes at intervals on the moving wire, means for spraying enamel or the like onto the moving articles, and a heating chamber for baking the coated articles.

6. In apparatus for enameling hooks, eyes or the like, a movable support for such articles, feeding means consisting of an inclined support over the movable support, and a device for releasing one eye or hook at a time allowing it to move onto said movable support whereby they will be spaced on the movable support, and means for applying coating material thereto.

7. In apparatus for coating hooks, eyes, or the like, a supporting wire, means for moving it, means for feeding hooks or eyes at intervals onto the wire said means consisting of an inclined bar over the wire, and a rotary toothed device at the lower end of the inclined bar the teeth of which arrest the articles and the notches of which successively release an article.

8. In apparatus for coating hooks, eyes or the like, a movable supporting wire, means for feeding hooks or eyes at intervals onto the wire, said means consisting of an inclined bar over the wire, and a rotary toothed device at the lower end of the inclined bar, the teeth of which arrest the articles and the notches of which successively release an article which passes onto the wire, and means for coating the articles on the wire.

9. In apparatus of the character described, an inclined support for hooks, eyes or the like, the lower end of which is stepped, means allowing an article to pass onto the step, means for arresting the said article on the lower part of the step and afterward releasing it, and a movable support to receive such articles.

10. The inclined support having a step at its lower end, in combination with a releasing device comprising two toothed disks of different sizes the teeth and notches of which break joints, the smaller disk allowing an article to pass onto the step as each notch passes the bar, and the teeth of the larger disk arresting the same on the step until the next tooth of the smaller disk comes into holding position and then releasing the same.

11. In apparatus of the character described, a supporting wire for hooks, eyes, or the like, means for moving the wire with articles thereon, and a grooved wheel over which the wire runs, said wheel being thin at its edge and having a thickened part in from the edge a distance less than the length of one of the articles on the wire whereby the lower ends of the articles will strike the wheel and be caused to fall from the wire.

12. A hook or eye supporting wire, means for moving it, means for coating said wire with a protecting material, means for hanging articles on the wire, means for spraying enamel or the like onto such articles, and means for heating the sprayed articles.

In testimony whereof, I have signed this specification in the presence of two subscribing witnesses.

WILLIAM M. CORTHELL.

Witnesses:
W. N. WOODSON,
C. E. PHILLIPS.